A. R. REESE.
HARVESTER.
No. 6,899.
Reissued Feb. 1, 1876.
Fig. 1.
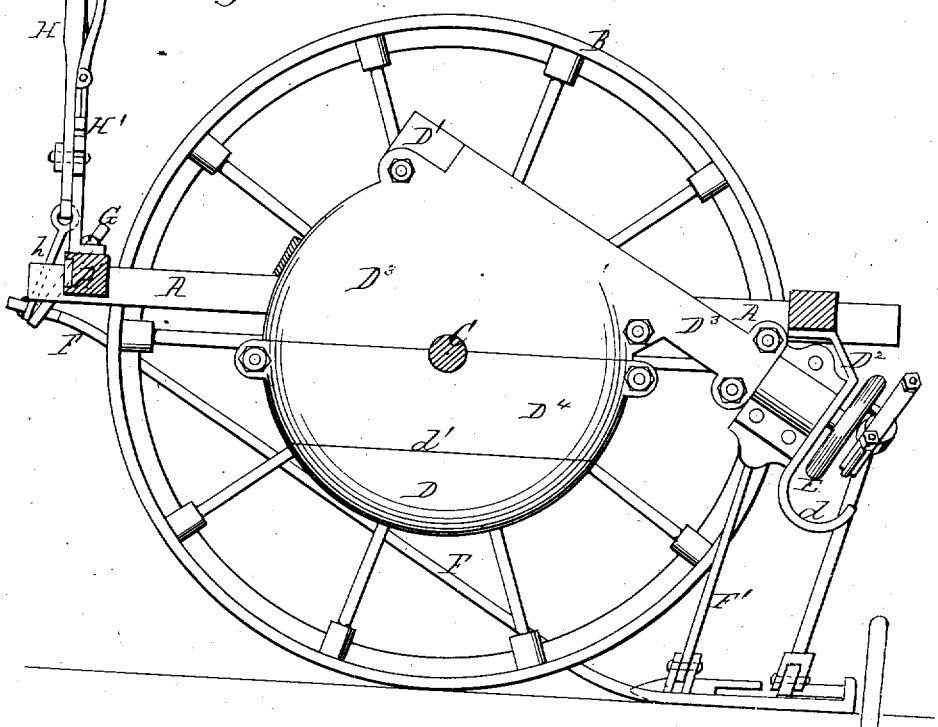
Fig. 2a
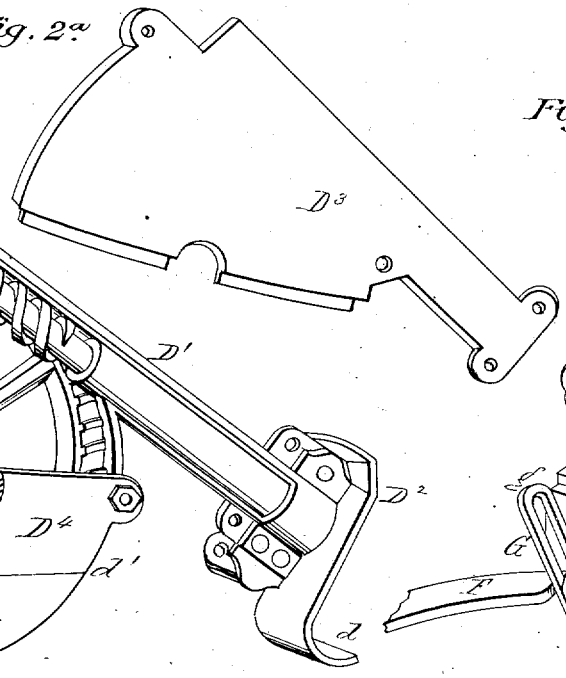
Fig. 2.
Fig. 3.
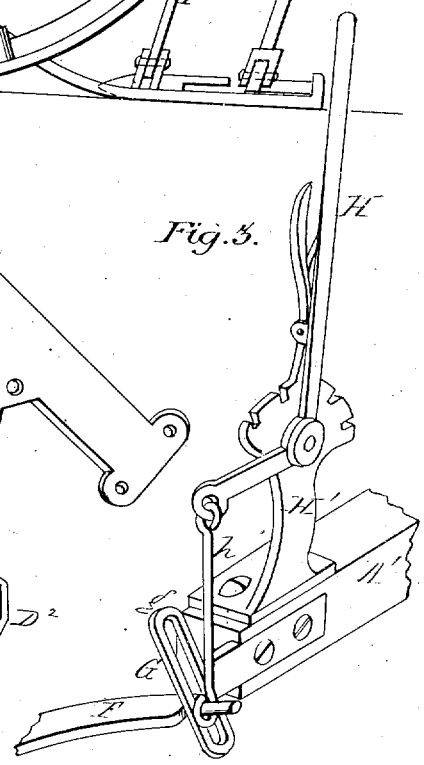
Witnesses:
Alex Mashin
John G. Sender
Inventor:
Adam R. Reese,
by A. M. Smith
Attorney

UNITED STATES PATENT OFFICE.

ADAM R. REESE, OF PHILLIPSBURG, NEW JERSEY.

IMPROVEMENT IN HARVESTERS.

Specification forming part of Letters Patent No. 154,281, dated August 18, 1874; reissue No. 6,899, dated February 1, 1876; application filed March 15, 1875.

*To all whom it may concern:*

Be it known that I, ADAM R. REESE, of Phillipsburg, county of Warren and State of New Jersey, did invent certain new and useful Improvements in Harvesting-Machines, of which the following is a full, clear, and exact description, reference being had to the accompanying drawing making part of this specification, in which—

Figure 1 represents a side elevation of the inclosing-frame and inner driving-wheel, &c., the outer wheel being removed. Figs. 2 $2^a$ show the inclosing-frame detached. Fig. 3 is a perspective view of the devices for adjusting the forward end of the drag-bar.

Similar letters of reference denote corresponding parts in all the figures.

The invention consists in the combination of the worm-wheel and screw crank-shaft for operating the cutters of a harvesting-machine with a metallic inclosing-frame, cored out at its bottom to form a closed reservoir, as hereinafter explained.

Various attempts have been made to substitute the worm and screw for the ordinary cogged gearing used in harvesting-machines, and some of these have been found to work well in practice when the gearing was new and the parts freshly oiled; but owing to the fact that the motion was produced by the movement of one part past and in frictional contact with another—or, in other words, by the rubbing of one surface upon another—the moment the lubricating-oil was exhausted the parts quickly became heated by this frictional or rubbing contact, and, as a consequence, were rapidly worn out and destroyed, necessitating their replacement by new gears at considerable expense before the machine was again fit for use. Among machinists this difference between worm or screw and cogged gearing is generally appreciated, and the difficulty would, in a measure, be obviated by frequent oiling and constant attention; but in the hands of farmers, and in the hurry of the harvest, this attention is ordinarily not given, and the result has been that the machines employing this form of gearing were in many cases speedily rendered useless, and they have failed to give the satisfaction which the simplicity of the gearing, and the lightness and the ease of its operation when new, appeared to guarantee.

In the drawing, A A′ represent the main frame, rectangular in form; B, one of the main driving and carrying wheels, mounted on a common axle, C, and independently connected therewith by backing-ratchets; D, the inclosing-casing, within which is placed the worm-wheel keyed to the axle C. The casing D is made in the main cylindrical in form, as shown in Figs. 1 and 2, and is provided on its upper forward face with an inclined tubular arm, $D^1$, for the reception of the screw crank-shaft, which has its bearings therein. The outer or rear end of this tubular arm $D^1$ has formed upon or attached to it an angular plate or bracket, $D^2$, adapting the arm $D^1$ to be connected with the rear transverse frame bar, and forming at *d* a shield extending underneath and in front of the crank wrist or wheel E. The casing D is, by preference, cast as above, in one piece, and open upon one side only, sufficiently to permit the introduction of the gearing, and closed when the gearing is in place by a side plate or plates, $D^3$ $D^4$. From the point indicated at *d′* to the bottom or lowest point of the casing, the casing is cored out in casting in such manner as to leave no joint or opening for the escape of lubricating-oil placed therein, and to a sufficient depth to insure the partial submerging of the rotating worm-wheel therein when the machine is in operation.

The location of the inclined screw crank-shaft and its inclosing sleeve or tube above the worm-wheel, instead of underneath the same, where it is ordinarily arranged, places its bearings above the lubricating-chamber; but the screw and its bearings will always be kept lubricated by the oil carried up by the teeth and periphery of the worm-wheel, and said teeth coming, every time they act upon the screw, freshly from the oil in the closed chamber within which they rotate, are kept constantly in condition for acting upon the screw with the least possible amount of friction and wear.

I am aware that gear-casings closed at the bottom have been used in connection with spur and bevel gears, and that such casings were adapted to contain lubricating-oil, if the user so desired; but it is well understood that such spur and bevel gears, when properly made and properly hung to the pitch-line of the cogs in the wheel, do not require oiling, and that, with their journals properly lubricated, such gears will work fully as well without oiling as with; but this is not the case with worm and screw gearing, in which the movement is entirely dependent upon the frictional contact of the teeth of the worm-wheel upon the threads of the screw-shaft, as above explained, and in which constant lubrication is required to prevent heating and wear, and to produce the best result of which said worm and screw gear is capable.

Having now described my invention, what I claim as new, and desire to secure by Letters Patent, is—

The combination, with the worm-wheel and screw crank-shaft actuating the cutters of a harvesting-machine, of an inclosing metal frame or casing vibrating around the main axle, and cored out at its bottom to form a closed reservoir, substantially as and for the purpose described.

ADAM R. REESE.

Witnesses:
FRED. C. TOLLES,
R. S. BUTTAM.